UNITED STATES PATENT OFFICE.

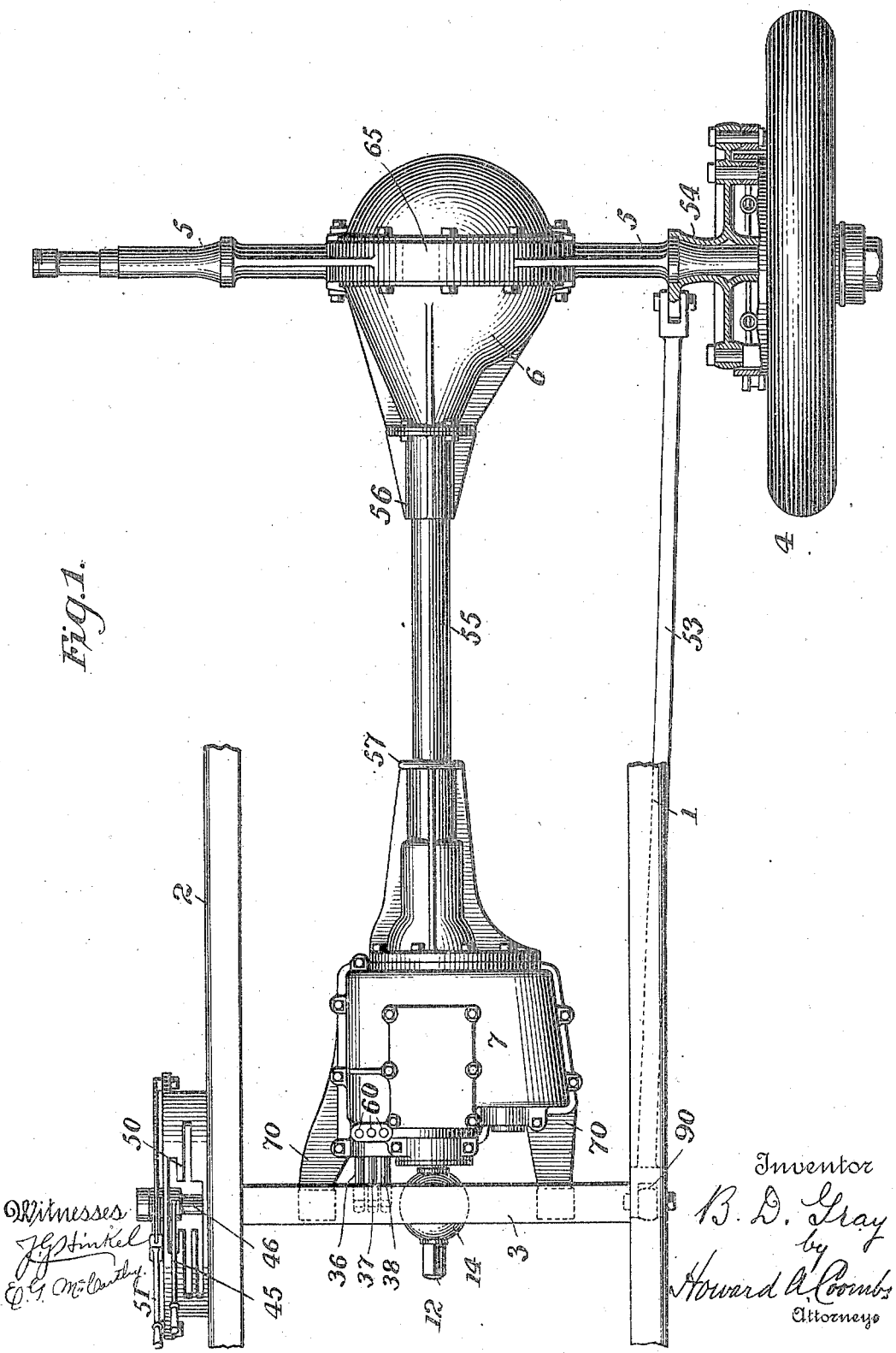

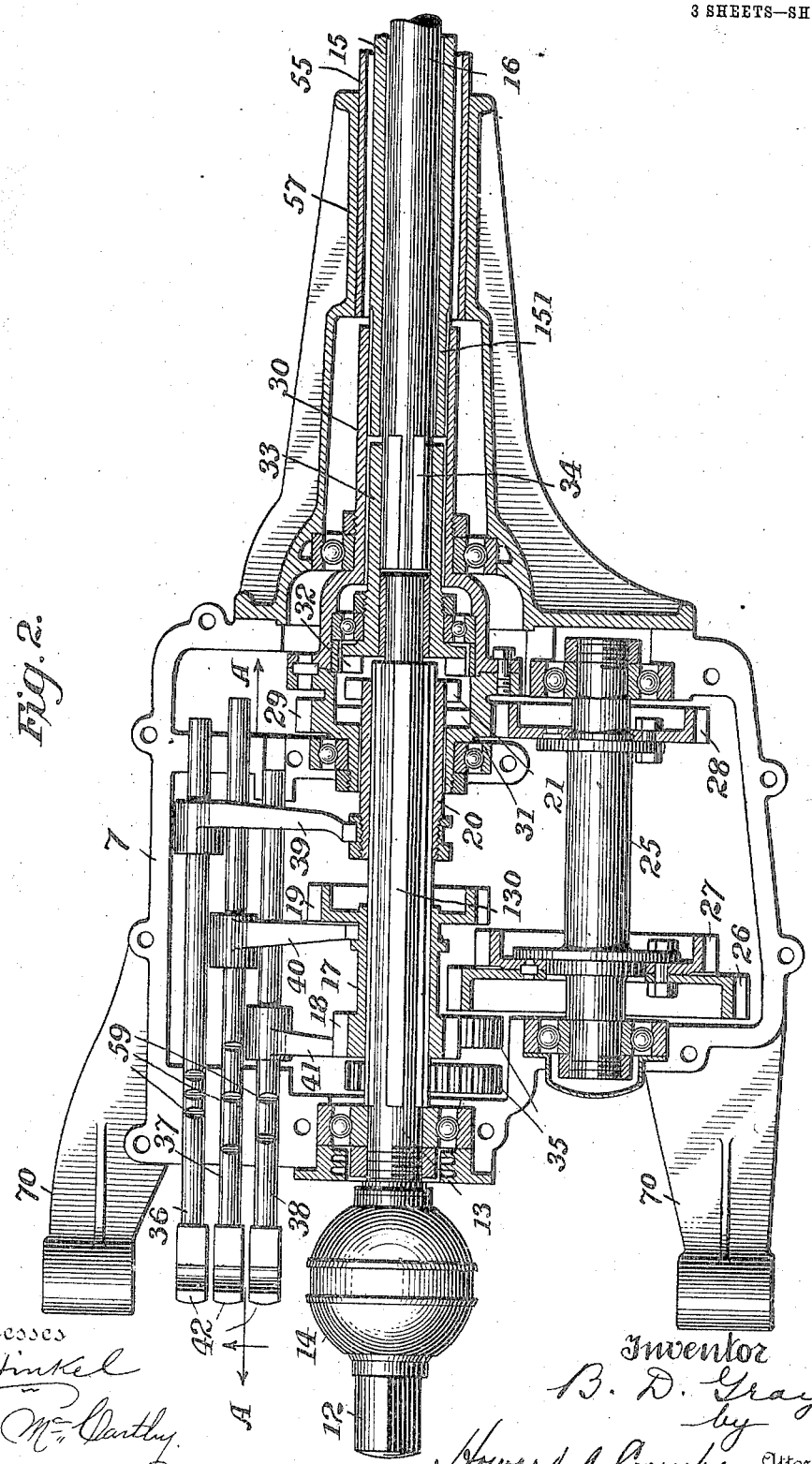

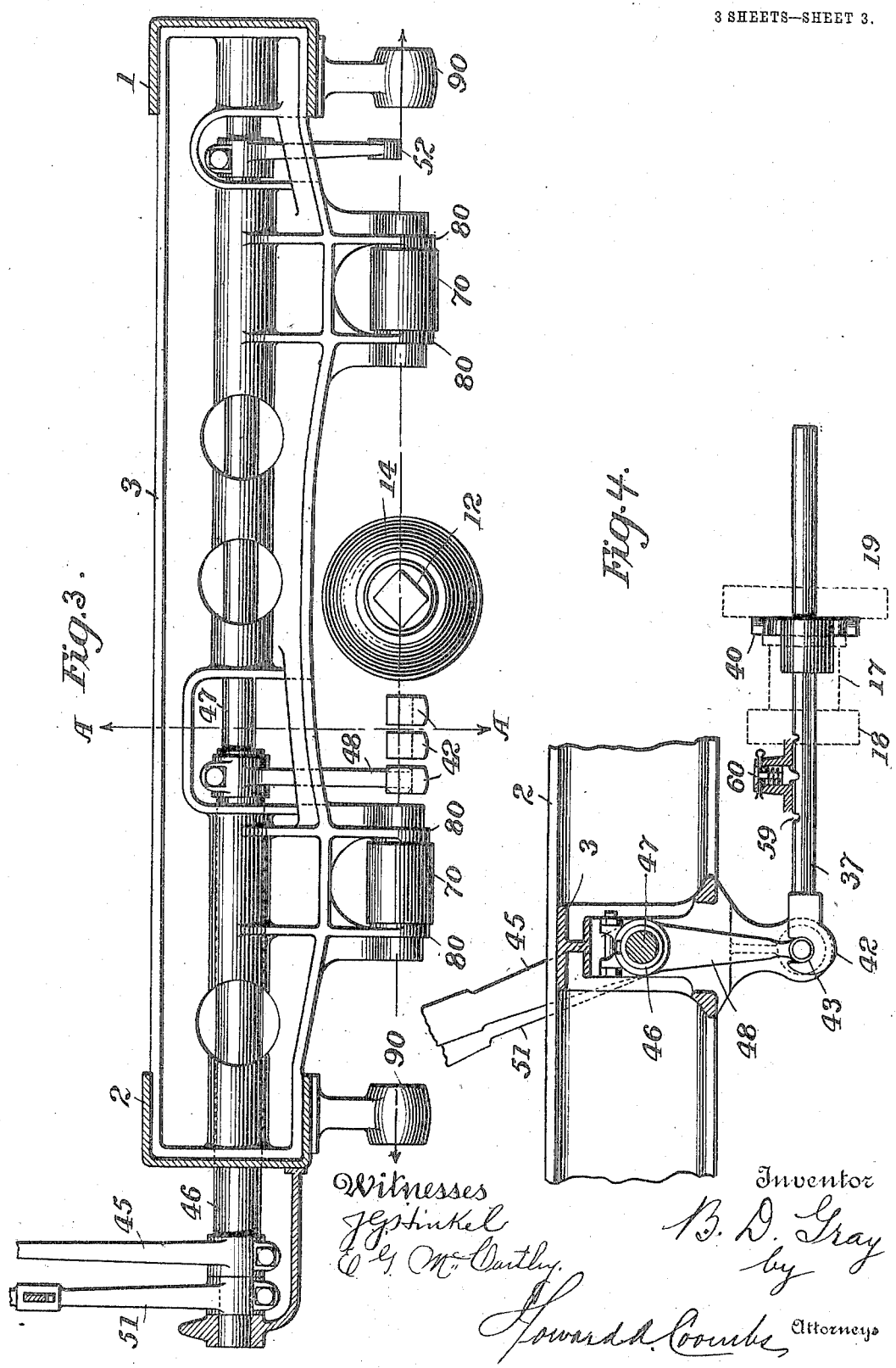

BUDD D. GRAY, OF PROVIDENCE, RHODE ISLAND.

MOTOR-VEHICLE.

947,637.

Specification of Letters Patent.  Patented Jan. 25, 1910.

Application filed January 6, 1909. Serial No. 470,916.

*To all whom it may concern:*

Be it known that I, BUDD D. GRAY, a citizen of the United States of America, and a resident of Providence, in the county of Providence and State of Rhode Island, have invented certain new and useful Improvements in Motor-Vehicles, of which the following is a specification.

My invention relates to the transmission gearing of motor-driven vehicles, and consists in certain improvements in the means for supporting and controlling the same, whereby greater efficiency, ease of control and economy in wear and tear are obtained, all as will be hereinafter pointed out in the detailed description of my improvements.

The principal object of my invention is to so support and connect the supporting means for the transmission gearing and the controlling mechanism for the same that all danger of twisting or racking said gearing, or of the various parts getting out of their proper relative position, owing to shocks and strains to which the vehicle is subjected while running, is obviated.

I have illustrated the essential features of my invention in the accompanying drawings, in which:—

Figure 1 is a plan view of a portion of frame and of running gear of a motor vehicle, showing the gear casings and the hand shifter lever. Fig. 2 is a sectional plan view through the transmission gear casing, illustrating means for supporting the casing and the arrangement of the gear and clutch shifting means. Fig. 3 is an end view of Fig. 1, showing the transverse frame member, which supports the transmission gear casing, the longitudinal frame members being sectioned, and Fig. 4 is a sectional elevation on the line A—A of Fig. 2.

In these views, 1 and 2 represent longitudinal frame members, and 3 a transverse frame member of a motor vehicle.

4 represents one of the driven wheels, and 5, a supporting member on which the wheels are journaled, said member being continuous from the outer end of the hub and of one wheel to that of the hub of the other wheel, the wheels being driven by driving-shafts contained within said member.

6 represents the differential casing, which is rigidly supported by the central annular portion 65 of said member 5, and 7 the transmission casing, which is pivotally supported by its projecting arms 70, 70, to the brackets 80, 80, projecting downwardly from said transverse frame-member 3.

12 represents the clutch-shaft, through which connection is made in a well-known manner to the motor, and 13 represents a shaft driven thereby through a universal joint 14, the center of which lies in the axis of pivotal support of the arms 70, 70, of the transmission casing 7. Said shaft 13 transmits the power of the motor to the differential by either of two shafts 15 and 16, both of which are permanently geared to the differential, as is common, the shaft 15 being tubular and surrounding the shaft 16. The transmission of power from the shaft 13 to the shafts 15 or 16 is as follows. The shaft 13, which is polygonal in cross-section, or else is provided with keys 130, has slidably mounted on it the sleeve 17, provided with gears 18 and 19, of different diameter, at its ends. Also slidably mounted on said shaft is a sleeve 20, having peripheral clutch-teeth 21, formed on its end.

Journaled in the casing 7, parallel to the shaft 13, is a countershaft 25, on which are secured near one end the gears 26 and 27, adapted to mesh respectively with the gears 18 and 19, and near the other end the gear 28. Also journaled in said casing 7, and loosely surrounding said sleeve 20, is a gear 29 which meshes with said gear 28, and which is rigidly connected to a sleeve 30, the end of which has a sliding feathered connection with the end 151 of the outer one 15 of said transmission shafts running to the differential. The hub of said gear 29 is provided with clutch-teeth 31, with which the clutch-teeth 21, on the sleeve 20, engage when said sleeve is moved in one direction, while, when said sleeve is moved in the other direction, its clutch-teeth 21 engage with teeth 32 formed on the end of a sleeve 33, loosely mounted on the reduced end of the shaft 13, and having a bearing within the sleeve 30, the other end of said sleeve 33 having a sliding feathered connection with the end 34 of the other one 16, of said transmission shafts.

The gearing just described provides for four different speeds forward, as follows:—
1st. Gears 18 and 26, and 28 and 29, in mesh, through sleeve 30 and shaft 15 to the differential. 2nd. Gears 19 and 27, and 28 and 29, in mesh, through sleeve 30 and shaft 15 to the differential. 3rd. Clutch-teeth 21 and 31 in engagement, through sleeve 30 and shaft 15 to the differential. 4th. Clutch-teeth 21 and 32 in engagement, through sleeve 33 and shaft 16 to the differential. The countershaft 25 runs idly when the third and fourth speeds are used. For the reverse, the idler gears 35, 35, are slid along their shaft, which does not appear in the drawings, into mesh with the gears 18 and 26, respectively, the transmission then being the same as in the first forward speed.

I will now describe the means for shifting the gears and clutch. Slidably mounted in the casing 7, parallel to the shaft 13, are three shifter rods 36, 37 and 38, to each of which is secured an arm by which the parts mentioned, are slid along their shafts. Thus, the rod 36 carries an arm 39, which engages sleeve 20; the arm 40 of rod 37 engages sleeve 17, and the arm 41 of rod 38 engages the idler reversing gears 35. Each rod has a head 42, which is hook-shaped in side elevation, as shown in Fig. 4, the centers of the recesses 43 of said heads lying in the same line as the center of the universal joint 14, when said rods are in their neutral positions, which line, as above stated, coincides with the pivotal axis of the transmission casing. A single hand-lever 45 serves to control the three shifter rods, said lever being secured to one end of a sleeve or tube 46, slidably mounted on a shaft 47, journaled in the cross frame member 3. The other end of said tube has secured to it a shifter 48, shaped at its end to engage the grooves or recesses 43 in the ends of the rods 36, 37, 38. The tube 46 is slid along the shaft 47, to bring the end of the arm 48 in engagement with the head of any one of said rods, whereupon, by rocking said tube, the rod engaged is slid in or out to shift the connected gears or clutch. The movements of the tube 46 are, of course, caused by the actuation of the hand lever 45, which works in the slotted segment 50, shown in Fig. 1, the same being so shaped that the lever can only be moved transversely of the vehicle when in its central or neutral position, from which it will be seen that when one of said shifter rods is moved longitudinally, the other two must necessarily be in their neutral positions. The shaft 47 serves to actuate the brakes, it having, for that purpose, a hand lever 51, secured to one end and an arm 52 secured near its other end, the latter being connected to the brakes—shown in section in Fig. 1—by a rod, not shown. Radius rods 53 run from the brake-anchors 54 to brackets 90, secured to the underside of the frame members 1 and 2, the pivotal axis of said rods to said brackets coinciding with the line before mentioned, as passing through the center of the universal joint 14, and the pivotal centers of the casing 7, as well as the ends of the shifter rods.

There remains to be described, the connection between the transmission and differential casings 7 and 6. This consists of a tubular member 55, rigidly secured at one end in the neck 56 of the differential casing, and fitting at its other end, both slidably and rotatably, in the neck 57 of the transmission casing. This member 55 keeps the said two casings in perfect alinement, but permits of such relative movement of the rear axle, relatively to the transverse frame member 3, as are caused by the wheels passing over uneven ground. The radius rods 53 maintain the distance between the pivotal axis of the casing 7 and the center of the rear axle uniform; as long as the center line of the rear axle remains parallel to the horizontal plane of the frame, no movement takes place between the tubular member 55 and the casing 7, and consequently also no movement between the shafts 15 and 16 and their driving sleeves 30 and 33, but when the rear axle is tilted transversely by reason of one wheel passing over an obstruction, the tube 55 rotates slightly in the neck 57 of casing 7, and the distance between the pivotal axis of said casing and the center of the rear axle is very slightly shortened, this being permitted by the telescopic connection between 55 and 57, 15 and 30, and 16 and 33, above described.

The construction just described permits of a direct drive on two different speeds from the clutch shaft to the differential with but one universal joint, that one providing for any angularity which may occur between the center lines of the motor shaft and the transmission shaft.

I may add that the rods 36, 37 and 38 are preferably provided with notches, 59, with which co-act spring-pressed pins or catches, indicated at 60 in Figs. 1 and 4, the purpose being to prevent said rods from moving from the positions in which they are placed by the hand lever 45, except when positively moved by said lever.

Having thus described my invention, what I claim is:—

1. In a motor-vehicle, in combination with the frame and rear axle, of a change-speed-gear casing pivotally supported upon a transverse member of the frame, a differential-gear casing on the rear axle, a tubular member secured to said differential-gear casing and slidably and rotatably connected to said change-speed-gear casing, a transmission-shaft in said tubular member, a universal-joint connecting said shaft to the source of power and having its axis in alinement with the pivotal axis of said change-speed-gear casing, and radius-rods connected at one end to the rear axle and pivoted at the other end to the frame in alinement with the said axis.

2. In a motor-vehicle, in combination with the frame, of a gear casing pivotally supported thereon, a plurality of gear-controlling rods slidably mounted in said casing and having their ends lying normally in the axis on which said casing is pivoted, a member slidably and rotatably mounted in the frame, an actuating lever secured to said member and an arm projecting therefrom in position to engage the end of any one of said rods.

3. In a motor-vehicle, in combination with the frame, wheels and brakes, of a gear-casing pivotally supported on a transverse member of said frame, a plurality of shifting rods slidably mounted in said casing and having recesses in their ends, the centers of said recesses normally lying in the pivotal axis of said casing, a shaft journaled longitudinally in said transverse member, a sleeve mounted to slide on said shaft and having a hand lever on one end and an arm, adapted to engage the recess of any of said shifting rods, at the other end, a hand lever on said shaft and connections from the latter to the brakes.

4. In a motor-vehicle, in combination with the frame and rear-axle, of a change-speed-gear casing pivotally supported upon the frame and yieldingly connected to the rear-axle, a transmisison-shaft in said casing, a universal-joint connecting said shaft to the source of power, the center of said universal-joint lying in the axis upon which said casing is pivoted, radius-rods pivotally connected to the rear axle and to the frame, their connection to the frame lying in the said axis, a plurality of gear-controlling rods slidably mounted in said casing and having their ends lying normally in the axis on which said casing is pivoted, a member slidably and rotatably mounted in the frame, an actuating lever secured to said member and an arm projecting therefrom in position to engage the end of any one of said rods.

Signed at Providence this fourth day of January, 1909.

BUDD D. GRAY.

Witnesses:
F. R. BUNNELL,
E. J. WARING.